Patented Oct. 8, 1940

2,216,941

UNITED STATES PATENT OFFICE 2,216,941

RESIN AND PROCESS FOR ITS PREPARATION

Anthony H. Gleason, Elizabeth, N. J., assignor to Standard Oil Development Company, a corporation of Delaware No Drawing. Application December 16, 1937, Serial No. 180,136

11 Claims. (Cl. 260—67)

This invention relates to the production of improved resins from aromatic petroleum fractions and to the resulting products.

It has been found that hard, light-colored, soluble and fusible resinous products are obtained by reaction of aromatic petroleum fractions and aldehydes.

It has also been found that superior resins are obtained from selected petroleum fractions which are substantially free of olefins and oxygen compounds.

It has also been found that the nature of the catalysts for this reaction materially affects the resins secured, and catalysts leading to the formation of especially desirable resins have been discovered.

Other and further objects of this invention will be apparent from the following description and the claims.

The following examples illustrate suitable methods for carrying out the process of this invention and for preparing the products described herein:

Example 1

250 grams of zinc chloride were dissolved in 2½ liters of glacial acetic acid. To this solution was added 1 liter of an aromatic petroleum fraction boiling from 135 to 185° C. and obtained by extraction with liquid sulfur dioxide of a virgin naphtha distillate of Conroe petroleum. 280 grams of paraformaldehyde (trioxymethylene) were then added to the solution while stirring and heating, complete solution being obtained at about 90° C. The resulting solution was heated under reflux at about 110° C. for 18 hours. Separation of two phases was apparent after about 2 hours heating, but these were kept intimately mixed by the boiling of the acetic acid phase. The reaction mixture was then cooled, whereupon it separated into an upper layer of a tough, solid material and a lower layer containing most of the acetic acid. This was poured off and the solid material was dissolved in benzene. The benzene solution was washed with water in four separate washings to remove acid and was then dried over sodium sulfate. The benzene was then removed by distillation during which a still temperature of 250° C. at a vacuum of 28″ of mercury was attained in order to strip the resinous product substantially completely of volatile materials. There was thus obtained as the distillation residue a hard, brittle resin having a melting point of 122° C. (method of Robert Rauh, Inc., involving heating a plug of the resin under mercury) and a light amber color in cubes ⅞″ thick (rosin standard, color K).

This resin is stable and fusible, has an acidity of not more than from 1 to 1.5 milligrams of KOH per gram, is soluble in ethyl acetate, butyl acetate, tung and other drying oils, acetone, methyl-ethyl ketone, benzene, and other aromatic hydrocarbon solvents. It is soluble in hot butyl alcohol and hot amyl alcohol and is slightly soluble in naphtha and in hot isopropyl alcohol. It is insoluble in ethyl alcohol and in petroleum ether. The yield of this resin was about 101% by weight based on the petroleum fraction used.

The resin preparation procedure described in Example 1 was repeated, substituting sulfuric acid, phosphoric acid, and ferric chloride for the zinc chloride used in Example 1. The resulting products were in every case very dark in color, below D on the rosin scale; in a similar test with aluminum chloride no resin was obtained.

It is preferable to avoid the presence of iron during the resin-forming reaction, as it was found that resins prepared according to the process described in Example 1 were much poorer in color when carried out in a steel kettle than was the resin from identical runs made in glass. In two comparative runs the resin made in the absence of iron had a pale amber color (M), while that made in a steel kettle had a pale red color (F).

Example 2

Similar resins were prepared by the same process described in Example 1 from a number of other aromatic petroleum fractions, the only difference in the reaction conditions being that the time for heating under reflux varied from about 6 to 16 hours, depending upon the reactivity of the hydrocarbons used and the melting point desired.

The aromatic petroleum fractions in each case were distillate fractions of an extract obtained by treating virgin naphthas from an aromatic base petroleum with liquid sulfur dioxide. This extract was distilled and the distillate separated into a number of different fractions. The boiling range of the fraction used and the color and the melting point of the resin obtained therefrom are given in the following table:

| Aromatic petroleum fraction—boiling range | Color | Melting point ° C. |
|---|---|---|
| 132–142° C | Pale amber (M) | 105 |
| 135.8–137.3° C | Pale yellow (WG) | 90 |
| 137.7–138.8° C | Pale greenish-yellow (WW) | 120 |
| 138.8–141.8° C | Pale greenish-yellow (X) | 115 |
| 143–145° C | Dark red (D) | 125 |
| 155–158° C | Pale amber-red (G) | 90 |
| 160–176° C | Amber (I) | 115 |

Example 3

The preparation described in Example 1 was repeated using a hydroformed naphtha boiling from 215 to 270° C. and obtained by destructive hydrogenation of an SO₂ extract of a petroleum burning oil at a temperature of about 980° F. with hydrogen at a pressure of 3,000 pounds per square inch and in the presence of a destructive hydrogenation catalyst containing sulfides and oxides of molybdenum, the hydrogenation conditions being selected to promote the formation of aromatic hydrocarbons. The resin obtained in this preparation had a very dark color, below D on the rosin scale.

A separate portion of the same hydroformed naphtha fraction was treated with aluminum chloride, percolated through absorptive clay and then distilled over caustic soda. It was then used in the same resin preparation procedure and there was obtained a resin having a pale amber-red color (G) and a melting point of 135° C.

The aromatic petroleum fractions used in this invention boil preferably within the approximate limits of 125 and 275° C. Still higher boiling fractions may be used but the resins obtained therefrom are generally poor in color. Also fractions boiling below 125° C. may be used. These, however, have been found to be relatively difficultly reactive and, when using 10% zinc chloride in acetic acid as the catalyst, require the use of reaction temperatures of about 135° C. The reaction is conducted under pressure in order to attain this temperature in liquid phase and the resulting products are dark in color. This disadvantage may be diminished by carrying out the reaction at lower temperatures in the presence of more active catalyst combinations which will be described below.

These aromatic petroleum fractions may be obtained from relatively highly aromatic petroleum, and from the aromatic extracts obtained by treating petroleum oils with solvents having a selective action between the aromatic and paraffinic components of the oil. Examples of such solvents are liquid sulfur dioxide, phenol, nitrobenzene, benzol-acetone, furfural, and the like, which selectively dissolve the aromatic components. Liquefied propane, and other solvents which selectively dissolve the paraffinic components, may also be used, in this case the aromatic fraction being obtained as the raffinate.

The aromatic petroleum fractions used in this invention have an aniline point below about 10° C. and preferably have an aromatic content above about 80% by the Kattwinkel test. These fractions are preferably free from olefins, sulfur, and oxygen compounds. The use of cracked oils results in soft products which are very dark in color. It is preferable to remove the olefins from such products by suitable pre-treatment with aluminum chloride and/or sulfuric acid when resins of light color and high quality are desired. It is preferable to treat the aromatic fractions with absorptive clays, as by percolation through the clay, shortly before they are used in the resin-forming process. This pre-treatment is especially desirable if the aromatic fractions have been exposed to air or light for any length of time. The oils may also be treated with caustic soda, in either aqueous or alcoholic solution or in solid form. In using such treatments, care should be taken to remove all traces of caustic soda from the oil before the resin-forming reaction. An especially suitable method for this treatment is to distill the oil over solid caustic soda.

Since the reaction is preferably conducted under substantially anhydrous conditions, the formaldehyde is most conveniently used in the form of paraformaldehyde, as this contains very little water and can be handled in solid form; however pure formaldehyde may also be used, and may be passed into the reaction vessel as a gas or in admixture with inert gases. When supplying the formaldehyde in gaseous form, the rate of reaction has been found to be much slower, but the product obtained is equal in quality to that prepared when using solid paraformaldehyde.

The temperature of the resin-forming reaction is most conveniently controlled by boiling under reflux. In such operations the reaction temperature varies from about 105 to 115° C., depending upon the nature of the hydrocarbon reagent. The time varies according to the rate of reaction and the melting point desired. When using 10% zinc chloride in acetic acid, the time of reaction varies between about 6 and 18 hours, depending upon the petroleum fractions and the desired color and melting point of the resin. For example, when using a petroleum fraction boiling between 138.8 and 141.8° C. in the procedure described in Example 1, the resin obtained after 8 hours reaction had a pale greenish-yellow color (X) and a melting point of 115° C.; the resin obtained after 16 hours reaction had a pale yellow-amber color (N) and a melting point of 125° C.

The relative amounts of zinc chloride and of acetic acid may also vary widely, the acetic acid being preferably used in the major proportion and the zinc chloride in about 8 to 20% of the total of these two components. Proportions of zinc chloride below 10% give a relatively slower reaction rate, while higher proportions cause increased color formation. The zinc chloride should be dissolved, hence the solubility limit of zinc chloride in the acid used should not be exceeded.

The acetic acid is preferably used in an amount greater than the sum of the aromatic hydrocarbons and the aldehyde. Decreasing the ratio of acetic acid results in a softer product, other conditions being equal.

Other water-soluble fatty acids, such as propionic and butyric acid may be used in place of the acetic acid, with somewhat slower reaction rates.

The aromatic hydrocarbons and the aldehyde are used preferably in about equimolal proportions. The use of a smaller proportion of formaldehyde results in a decreased yield of a softer product. The use of a large proportion of formaldehyde should be accompanied by a corresponding increase in the amount of acetic acid, and results in a higher yield of a harder product.

It has also been observed that the reaction rate is greatly accelerated when using chloracetic acids in place of acetic acid. This is illustrated in the following example.

*Example 4*

1 gram of zinc chloride was dissolved in 125 cc. of monochloracetic acid. 50 cc. of an aromatic petroleum fraction boiling between 138 and 140° C., and obtained in the same manner as that described in Example 1, was added. 14 grams of paraformaldehyde were then added and the mixture was heated slowly with stirring at 105° C. The separation of two phases became apparent in 7 minutes at this temperature and the reaction was completed after 45 minutes heating at 105° C. The reaction mixture was then diluted with water and the resin was extracted therefrom with benzene. The benzene solution was washed with water and the resin recovered therefrom in the same manner as described in Example 1. There was thus obtained a yield of over 90% of a resin having a pale yellow-amber color (N) and a melting point of 120° C.

Dichloracetic acid, and other chlor-fatty acids may also be used in place of the monochloracetic acid in the above example. The amount of zinc chloride used is preferably below its solubility limits in the fatty acid used. It should not be above about 3% when using monochloracetic acid, or above about 1% when using dichloracetic acid.

The resins prepared according to this invention are suitable for use in molding compositions and for the preparation of cast and molded articles. They are also advantageously used in surface coating preparations, such as varnishes, lacquers, enamels and paints, in partial or complete substitution for the natural and modified gums and rosins and the synthetic resins generally used in varnish manufacture and the other coating preparations mentioned.

The following example illustrates a suitable method for preparing a varnish with the resins of the present invention:

Example 5

Separate portions of the resin described in Example 1 were added to three different portions of tung oil in proportions to make varnishes of 15, 25, and 50-gallons oil length. The mixtures were heated rapidly to 560° F., then cooled to 500° F. and held at this temperature until sufficient thickening or body developed. It was observed that the resin melted and dissolved readily in the tung oil in all cases. Hydrocarbon thinners and dryers are added to the thickened solutions in suitable proportions to prepare finished varnish according to the usual practice.

This invention is not to be limited by any specific examples or other explanations which have been presented herein, as all of these are intended solely for purpose of illustration, but is to be limited only by the following claims in which it is desired to claim all novelty insofar as the prior art permits.

I claim:

1. Process for preparing a resin comprising reacting an aromatic petroleum fraction boiling within the approximate limits of about 125° C. and 275° C., substantially free of olefins, with formaldehyde in the presence of a water-soluble fatty acid and zinc chloride under substantially anhydrous conditions, and separating a resin from the reaction products.

2. Process according to claim 1 in which said aromatic petroleum fraction has an aniline point below about 10° C.

3. Process according to claim 1 in which said fatty acid is acetic acid.

4. Process according to claim 1 in which said reaction is conducted by heating the mixture under reflux for several hours.

5. Process according to claim 1 in which said aromatic petroleum fraction boils between the approximate limits of 132 and 142° C.

6. Process according to claim 1 in which said petroleum fraction boils between the approximate limits of about 215 and 270° C.

7. Process for preparing a resin comprising mixing an aromatic petroleum fraction boiling within the approximate limits of about 125° C. and 275° C. substantially free of olefins with a solution of 8 to 20% of zinc chloride in concentrated acetic acid, then adding formaldehyde, heating the mixture in substantially anhydrous condition under reflux with vigorous stirring, at least during the period that the mixture is unhomogeneous, for about 6 to 16 hours and separating a resin from the resulting products.

8. Process according to claim 7 in which said aromatic petroleum fraction boils within the approximate limits of 132 and 142° C.

9. Process according to claim 7 in which said aromatic petroleum fraction boils within the approximate limits of 215 and 270° C.

10. Improved resin prepared according to claim 7 having an amber to pale greenish-yellow color in cubes ⅞" thick, having a melting point between about 90 and 120° C., soluble in acetone, esters, and aromatic hydrocarbons, insoluble in petroleum ether and ethyl alcohol.

11. Process for preparing a resin comprising reacting under substantially anhydrous conditions aromatic hydrocarbons boiling within the approximate limits of about 125° C. and 275° C. with a formaldehyde intimately mixed with a water-soluble fatty acid solution of zinc chloride boiling under reflux for a period of about 6 to 16 hours, and separating a resulting resin product.

ANTHONY H. GLEASON.